Figure 1:
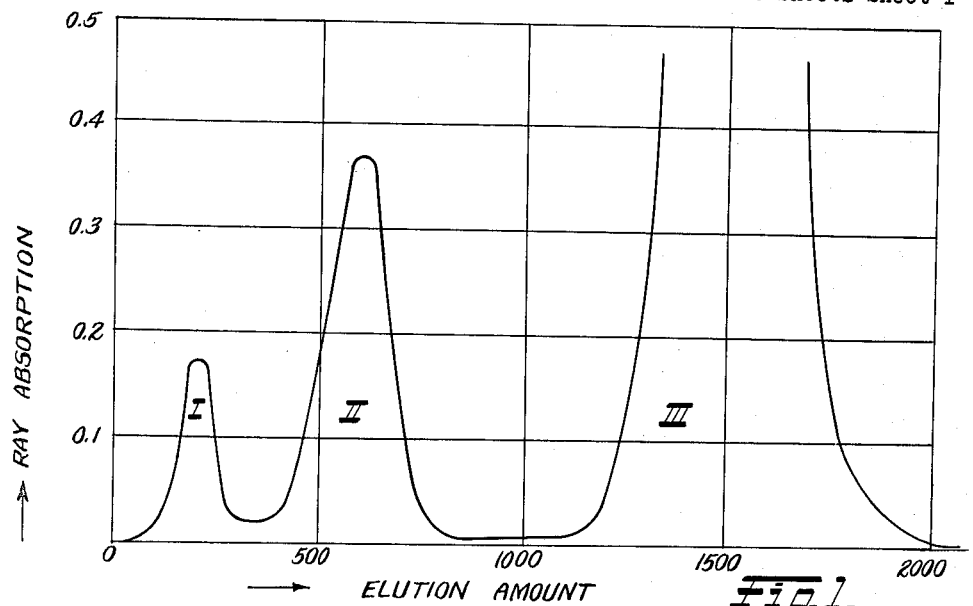

INVENTORS
K. KOTANAKA
Y. TSUNODA
A. MURATA
H. SATO
N. FUJITA

INVENTORS
K. KOTANAKA
Y. TSUNODA
A. MURATA
H. SATO
N. FUJITA

BY Holcombe, Wetherill & Brisebois ATTORNEYS

April 12, 1966 KATSUHIKO KOTANAKA ET AL 3,245,993
METHOD FOR THE CONTINUOUS PRODUCTION OF MELAMINE
Filed Dec. 23, 1963 3 Sheets-Sheet 3

INVENTORS
K. KOTANAKA
Y. TSUNODA
A. MURATA
H. SATO
N. FUJITA
BY
Holcombe, Withrill & Briselois ATTORNEYS 3,245,993
METHOD FOR THE CONTINUOUS PRODUCTION OF MELAMINE
Katsuhiko Kotanaka, Suginamiku, Tokyo, Yutaka Tsunoda and Atsuo Murata, Neigun, Toyama, Hideo Sato, Kitatamagun, Tokyo, and Nagato Fujita, Mitaka, Tokyo, Japan, assignors to Nissan Kagaku Kogyo Kabushikikaisha, Tokyo, Japan
Filed Dec. 23, 1963, Ser. No. 332,628
Claims priority, application Japan, Dec. 28, 1962, 37/59,188
4 Claims. (Cl. 260—249.7)

The present invention relates to a method of producing melamine by the thermal decomposition of urea. This method comprises the steps of continuously introducing urea and ammonia at the bottom of a large-diameter vertical reaction tube with a built-in heater keeping the reaction temperature in the range of 390° C. to 450° C.; keeping the partial pressure of ammonia at less than 140 kg./cm.$^2$ more specifically at more than 62 kg./cm.$^2$ at 390° C. at more than 114 kg./cm.$^2$ at 450° C. and at a larger value than such a minimum value as assures non-occurrence of ammonia-removing condensation at the intermediate temperatures between these two extremes; thereby causing a transformation of urea into melamine in the liquid phase mainly constituted by molten melamine; and continuously removing from the top of the said reaction tube the molten melamine in a liquid state.

There are a number of patents and considerable technical literature concerning the production of melamine by the thermal decomposition of urea. The methods disclosed in them may be roughly divided into the liquid phase method and the gaseous phase method. The former concern a process in which the melamine-forming reaction takes place in such a way that the melamine is kept in a molten state in the reaction system and in which the melamine is discharged from the reaction system in its molten form. The latter concerns a process in which the reaction of thermal decomposition takes place in such a way that the melamine is kept in vapor phase in the reaction system and the melamine formed is discharged in vapor phase from the reaction system together with ammonia and other inert gases.

According to U.S. Patent No. 2,566,223 for the gaseous phase method, melamine is extremely stable in a vapor phase containing ammonia; therefore the melamine obtained by the gaseous phase method contains very small amounts of such products of ammonia-removing condensation as melam and melem. Execution of this method on an industrial scale, however, would involve considerable difficulty. Namely, in order to keep melamine in gaseous phase it would be necessary to use an extremely high reaction temperature or to make an extremely liberal addition of ammonia and other inert gases, or to combine these two steps. Elevated reaction temperature would promote the corrosion of apparatus and as the result the selection of anti-corrosive material would pose a problem. Increased addition of ammonia and other inert gases would necessitate increased volume of the reaction vessel; moreover, disposition of the waste gas after separation of the melamine would present a problem. Because of these inherent difficulties, the gaseous method has been found impractical and uneconomical and has not been used industrially for some years past.

Prior disclosures related to the liquid phase method propose the use of a small-diameter, long pipe reactor and that of a large-diameter, vertical reaction tube. The said small-diameter reactor is proposed by U.S. Patent No. 2,776,284; but such a reactor possesses a small area of heat conduction and accordingly it is inconvenient to supply heat from outside; besides, it is liable to be clogged with interim reaction products. The said large-diameter reaction tube is mentioned in German Patent No. 1,075,625. However, this is of the external heating type with an agitator, so that it hardly permits uniform heating, and moreover, the complexity of its mechanism will unavoidably cause various troubles.

In the method proposed by the present invention a large-diameter, vertical reaction tube with a built-in heater is employed for the liquid phase reaction method of melamine formation. As employed herein, "large-diameter" means "having a diameter of at least 100 mm. and the ratio of diameter to length; 1:0.5–10."

Over the conventional processes, the new process according to our invention has the following advantages:

(1) Because of the simplified structure of the reactor, conventional relatively inexpensive and readily obtainable materials may be used for its construction. Moreover, it is relatively simple to manufacture and repair.

(2) There is hardly any possibilty of the tube becoming clogged with interim products, so that the tube can be operated for a long period with a stable output.

(3) Since the melamine-forming reaction takes place in a liquid phase which occupies the greater part of the reactor volume, a small volume will suffice.

(4) Especially violent agitation will occur on account of the gas generated by the reaction, so that the temperature distribution will be kept uniform and the reaction will go on smoothly.

(5) The liquid phase in the reactor, having a similar mechanism of heat conduction to that of a boiling liquid, will exhibit a very high coefficient of heat conduction. Accordingly, the surface area of the built-in heater can be small and no trouble will be encountered in providing a suitabe anti-corrosive material.

As described in the above, the method as proposed by this invention, if executed on an industrial scale, should be highly economical and practical.

As a matter of fact, when actually a large-diameter reaction tube was utilized for continuous production of melamine, secondary products of reaction which had never occurred in a small-scale experiment happened to accompany the process in many cases; and these secondary products turned out to be very injurious to the quality of melamine obtained.

The present invention has as its objective to remove this drawback of the liquid phase method, thereby permitting its commerical use.

Figure 2:
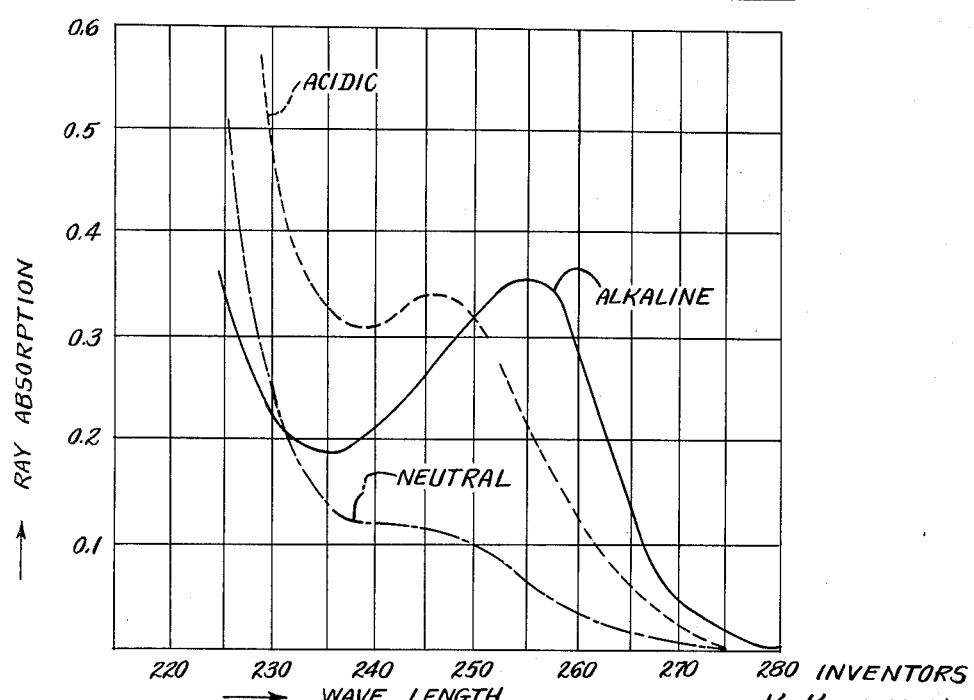
Figure 3:
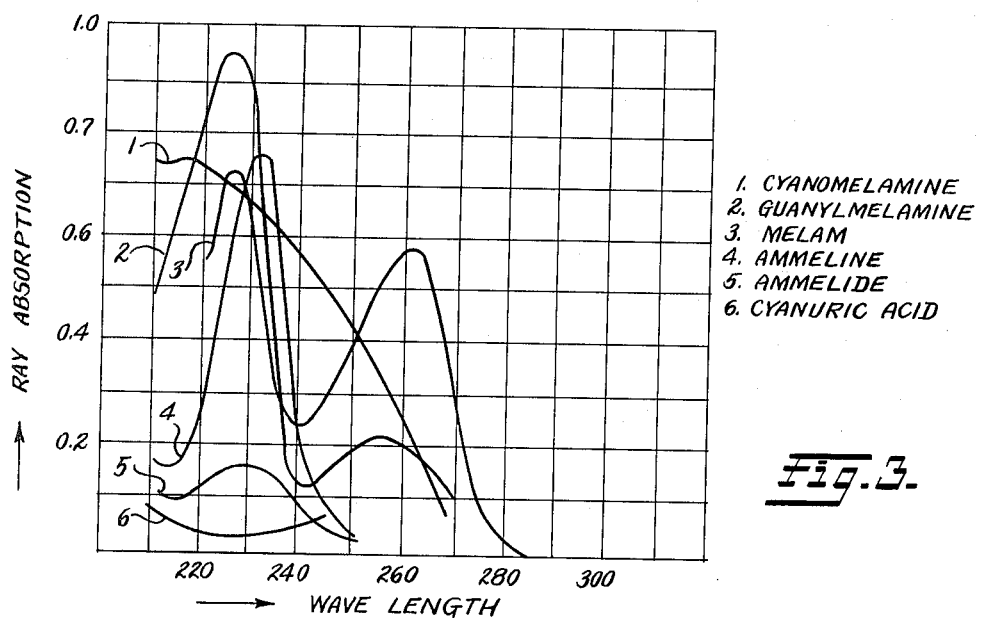
Figure 4:
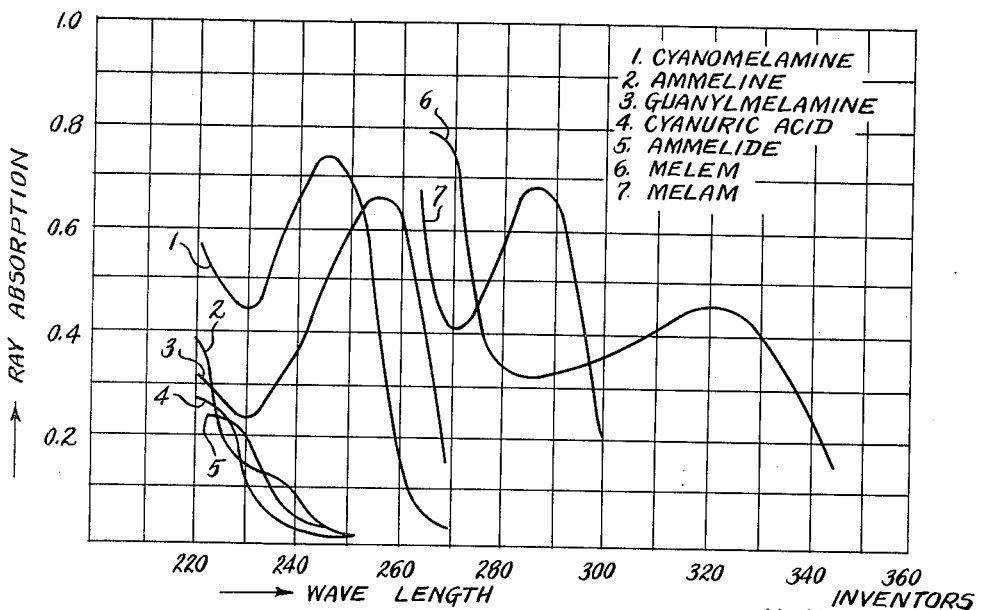
Figure 5:
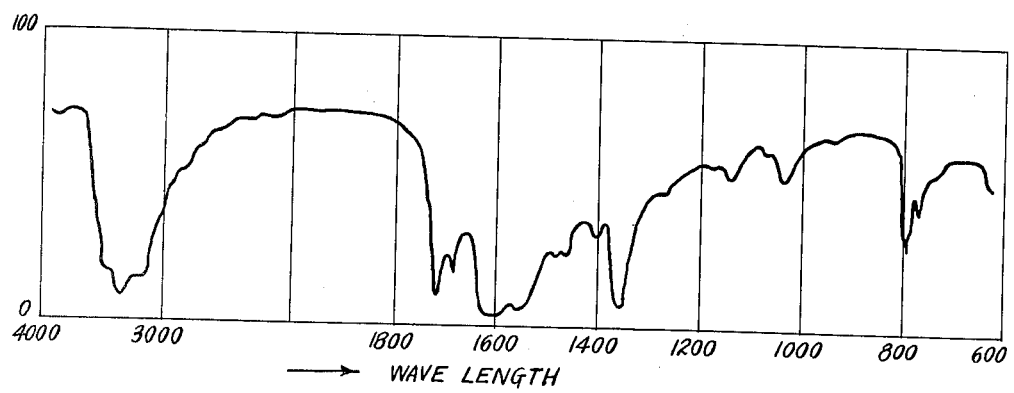
Figure 6:
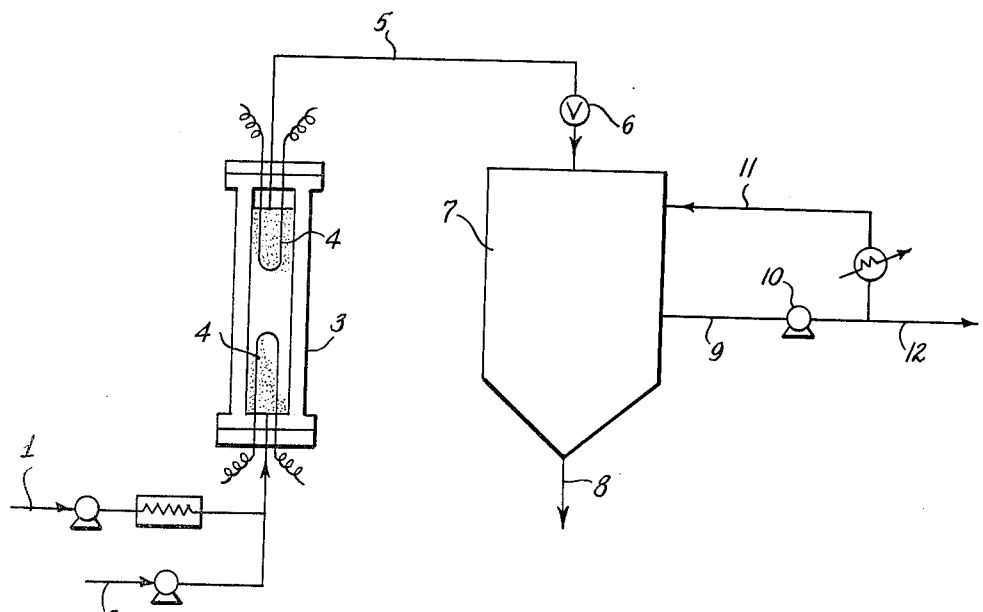

The specific difficulties encountered in large scale use of the liquid-phase process and the steps taken to overcome them will now be described with reference to the accompanying drawings, in which:

FIG. 1 is an elution curve for crude melamine;
FIG. 2 shows the ultraviolet spectrum of the composition which causes the second peak in the curve of FIG 1;
FIG. 3 shows the acidic ultraviolet spectrum of the previously known impurity in crude melamine;
FIG. 4 shows the alkaline ultraviolet spectrum of the previously known impurities in melamine;
FIG. 5 shows the infra red absorption spectrum of ureidomelamine; and
FIG. 6 is a diagrammatic sketch showing the equipment used in carrying out our process.

We began our investigation in the following manner:
One hundred mg. of crude melamine obtained by means of a large-diameter reaction tube was dissolved in 300 cc. water, and after being adsorbed by positive ion exchange resin, was eluted by N/2 hydrochloric acid. Its ultraviolet ray absorption (230 m$\mu$) after elution was measured. Plotting the relation between the measured degree of absorption and the quantity of elution, the elution curve of FIG. 1 was obtained. The peak I in this figure corresponds to the mixture components ammeline and ammelide; the peak III corresponds to melamine. The peak II in the same figure, as seen from FIG. 2, comes at 255 mμ in an alkaline liquid and at 245 mμ in an acidic liquid; and corresponds to a component which is recognized as a substance differing from any of the known impurities the ultraviolet spectra for which are shown in FIGS. 3 and 4.

Through repeated dissolution and recrystallization, the component corresponding to peak II of the curve in FIG. 1 was separated from crude melamine.

The results of chemical analysis of the obtained component, shown below, approximately agree with the calculated values of $C_4H_7N_7O$.

|  | C | H | N | O | Total |
|---|---|---|---|---|---|
| Component corresponding to peak II: |  |  |  |  |  |
| First analysis | 28.19 | 4.218 | 57.49 | 10.49 | 100.388 |
| Second analysis | 28.26 | 4.183 | 57.15 | 10.77 | 100.368 |
| $C_4H_7N_7O$ | 28.40 | 4.140 | 57.99 | 9.47 | 100.000 |

A more eleborate study revealed that the said component is ureidomelamine with the following chemical formula:

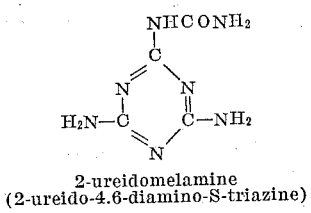

2-ureidomelamine
(2-ureido-4.6-diamino-S-triazine)

The infrared absorption spectrum of ureidomelamine as shown in FIG. 5 is nearly the same as the composite wave-form of melamine and urea.

Since ureidomelamine contains in the side chain to its triazine nucleus a hydrophilic ureido radical, the heat- and-water resistance of a product made of melamine resin including ureidomelamine will be reduced.

Next, for the purpose of establishing the relation between the reacting conditions and the yield of ureidomelamine, the following experiment was performed. From the bottom of an upright reactor cylinder, 120 mm. bore, 90 mm. in height, urea was charged at a rate of 12 kg./hr.; and under varying reaction temperatures and partial pressures of ammonia, a melamine-forming reaction was carried out. The composition obtained from crude melamine were as follows:

TABLE I

| React. temp., °C. | Ammonia partial pressure, kg./cm.² | Composition of product | | | Yield, percent |
|---|---|---|---|---|---|
|  |  | Melamine, percent | Urea, percent | Ureido-melamine, percent |  |
| 370 | 70 | 87.8 | 4.7 | 4.9 | 89.3 |
| 370 | 140 | 84.1 | 5.3 | 8.3 | 86.7 |
| 390 | 85 | 94.2 | 2.7 | 0.9 | 95.7 |
| 390 | 140 | 92.9 | 2.2 | 1.4 | 94.4 |
| 420 | 100 | 96.3 | 1.2 | 0.34 | 96.9 |
| 420 | 120 | 96.1 | 1.2 | 0.7 | 96.4 |
| 420 | 140 | 95.1 | 0.9 | 1.2 | 95.7 |
| 450 | 120 | 97.2 | 0.3 | 0.06 | 97.5 |
| 450 | 140 | 97.0 | 0.4 | 0.2 | 97.2 |
| 450 | 170 | 94.3 | 0.6 | 2.1 | 95.0 |

The experiment was repeated with the charging rate of urea reduced to 6 kg./hr., but the results obtained were approximately the same as given in Table I.

As for the relation between the ureidomelamine content in crude melamine and the reacting conditions, it was revealed that the lower the reaction temperature, the more of ureidomelamine was formed. This tendency was particularly conspicuous below 390° C., for instance about 5 to 8% ureidomelamine was formed at 370° C. Elevation of the reaction temperature reduced the quantity of ureidomelamine formed. However, there is a tendency for a temperature in excess of 450° C. to promote the formation of melam; therefore it is necessary to set the upper limit of temperature at 450° C. Thus, the required range of reaction temperature should be from 390° C. to 450° C.

Next, concerning the relation between the ammonia partial pressure and the quantity of ureidomelamine formed, it was noted that ureidomelamine was more apt to be formed under higher partial pressures of ammonia. Experimental data show that when the ammonia partial pressure was held below 140 kg./cm.², not more than 1.5% ureidomelamine would be formed in the reaction temperature range of 390° C. to 450° C.

As obvious from Table I, in order to avoid ureidomelamine formation, it would be desirable for the ammonia partial pressure to be as low as possible in the temperature range of 390° C. to 450° C.; but there is a tendency for the products of ammonia-removing condensation like melam, melem, to increase with a decrease in the ammonia partial pressure. Since these impurities also have a very adverse effect on the quality of resin obtained, the following experiment was conducted to find the conditions which control the formation of these products.

A small autoclave was charged with ammonia and pure melamine and maintained at a specified temperature for 30 minutes to one hour; and after quenching, the contents in the form of ammonia-removing condensation products such as melam and melem were quantitatively measured. Thus, the minimum ammonia partial pressure that ensures non-occurrence of such impurities was determined to be:

TABLE II

| Reaction temp. (° C.) | 370 | 390 | 420 | 450 |
|---|---|---|---|---|
| Minimum partial press. (kg./cm.²) | 51 | 62 | 85 | 114 |

In the actual reaction, if slightly higher pressure values than listed in Table II are adopted, the formation of melam, melem will be averted.

As described above, when a continuous production of melamine by the liquid phase method is carried out using the said large-diameter vertical reaction tube, the formation of such impurities as ureidomelamine, melam, melem, etc. can be prevented, if the reaction temperature is held between 390° C. and 450° C., the ammonia partial pressure being set at 140 kg./cm.² as the upper limit, and at 62 kg./cm.² as the lower limit at 390° C. and 114 kg./cm.² for the lower limit at 450° C. The hatched region as shown in Table III represents the limits within which the formation of the said impurities can be prevented.

TABLE III

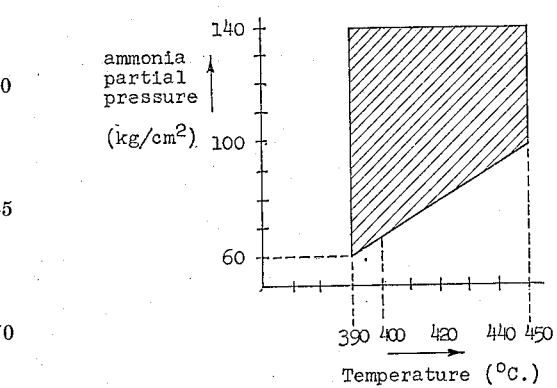

FIGURE 6 on the attached drawing shows an example of apparatus suitable for carrying out the present invention. In FIGURE 6, 1 is an ammonia-charging pipe; 2 is a urea-charging pipe; 3 is a vertical cylinder reactor, 300 mm. bore, 2200 mm. high with an effective volume of 190 l.; 4 are electric heating units with 2kw output each (18 units installed in all); 5 is a product-discharging pipe; 6 is an expansion valve; 7 is a melamine-gas separator; 8 is a melamine power-discharging pipe; 9 is a discharging pipe for the gas from the separator; 10 is a gas-circulating blower; 11 is a gas-circulating pipe; and 12 is a waste-gas discharging pipe.

One example showing how the invention may be carried out will now be described.

*Example 1*

Ammonia, subjected to 410° C., 120 kg./cm.², was charged into the bottom of the reactor 3 at a rate of 42 kg./hr.; at the same time, urea under 140° C., 120 kg./cm.² was also charged into the reactor at a rate of 84 kg./hr. The reaction temperature was maintained at 410° C. by the pipe heaters with a total output of 36 kw., while the reaction pressure was controlled to 130 kg./cm.² the ammonia partial pressure being thereby established at 110 kg./cm.².

Out of the top pipe in the reactor 3, the molten mass composed mainly of melamine was discharged together with gases and both were injected through the expansion valve 6 into the separator 7, to be expanded to atmospheric pressure. Simultaneously, a large amount of the circulating gas was introduced through the pipe 11 into the said separator 7 to quench and solidify the molten melamine. The melamine power formed was continuously taken out at the bottom and a part of the exhaust gas was cooled to 70° C. to 80° C. and then reused as a circulating gas. The rest of the exhaust gas was led out of the reaction system. The yield of crude melamine was 29.6 kg./hr. with the composition as follows:

| | Percent |
|---|---|
| Melamine | 96.0 |
| Urea | 1.5 |
| Ureidomelamine | 0.3 |
| Melam | 1.7 |
| Yield | 96.6 |

Reference Example *a* using an ammonia partial pressure lower than the lower limit given above, and reference Example *b* using a pressure higher than the said limit, are given below for purposes of comparison.

*Reference Example a.*—Under the same conditions as in Example 1, melamine formation was performed with the reaction pressure 80 kg./cm.², the ammonia partial pressure being 67 kg./cm.². The yield of crude melamine was 29.8 kg./hr., its composition being as follows:

| | Percent |
|---|---|
| Melamine | 91.4 |
| Urea | 1.9 |
| Ureidomelamine | 0.1 |
| Melam | 5.3 |
| Yield | 93.0 |

The total percentage of impurities was thus 8.6% v. 4% for the process of Example 1.

*Reference Example b.*—Under the same conditions as in Example 1 but with the reaction pressure 180 kg./cm.² and the ammonia partial pressure 151 kg./cm.², melamine was formed. The yield of crude melamine was 30.0 kg./hr., was the composition as follows:

| | Percent |
|---|---|
| Melamine | 93.0 |
| Urea | 2.8 |
| Ureidomelamine | 2.4 |
| Melam | 0.9 |
| Yield | 95.0 |

The total percentage of impurities was thus 7% v. 4% for the process of Example 1.

What is claimed is:

1. The method of continuously producing crude melamine having a reduced percentage of ureidomelamine therein which method comprises the step of continuously introducing urea and ammonia at the bottom of a reaction tube, maintaining the reaction temperature within the tube in the range between 390° C. and 450° C. while maintaining the ammonia partial pressure in the range below 140 kg./cm.² but above a line extending from 62 kg./cm.² at 390° C. through 85 kg./cm.² at 420° C. to 114 kg./cm.² at 450° C., thereby producing melamine in a liquid phase, and continuously removing the liquid melamine from the top of the tube.

2. The method of continuously producing crude melamine having a reduced percentage of ureidomelamine therein which method comprises the step of continuously introducing urea and ammonia into a vessel, maintaining the reaction temperature within said vessel in the range between 390° C. and 450° C. while maintaining the ammonia partial pressure in the range below 140 kg./cm.² but above a line extending from 62 kg./cm.² at 390° C. through 85 kg./cm.² at 420° C. to 114 kg./cm.² at 450° C., thereby producing melamine in a liquid phase, and continuously removing the liquid melamine from the vessel.

3. The method of producing crude liquid melamine having a reduced percentage of ureidomelamine therein which method comprises the step of reacting urea and ammonia while maintaining them at a temperature between 390° C. and 450° C., and maintaining the ammonia partial pressure in the range below 140 kg./cm.² but above a line extending from 62 kg./cm.² at 390° C. through 85 kg./cm.² at 420° C. to 114 kg./cm.² at 450° C.

4. The method of reducing the percentage of ureidomelamine in crude melamine produced in its liquid phase by reacting urea and ammonia, which comprises the step of carrying out said reaction at a temperature between 390° C. and 450° C. while maintaining the ammonia partial pressure in the range below 140 kg./cm.² but above a line extending from 62 kg./cm.² at 390° C. to 114 kg./cm.² at 450° C.

References Cited by the Examiner

UNITED STATES PATENTS

| 2,566,227 | 8/1951 | Paden et al. | 260—249.7 |
| 2,923,715 | 2/1960 | Freifelder et al. | 23—290 |
| 2,970,042 | 1/1961 | Lagerway | 123—290 |
| 3,030,193 | 4/1962 | Marullo et al. | 123—290 |
| 3,095,416 | 6/1963 | Crowley et al. | 260—249.7 |
| 3,116,294 | 12/1963 | Marullo et al. | 260—249.7 |
| 3,141,884 | 7/1964 | Schmitt et al. | 260—249.7 |

WALTER A. MODANCE, *Primary Examiner.*

JOHN M. FORD, *Examiner.*

MARION W. WESTERN, *Assistant Examiner.*